(12) United States Patent
Dantlgraber

(10) Patent No.: US 7,828,540 B2
(45) Date of Patent: Nov. 9, 2010

(54) DRIVE UNIT

(75) Inventor: Joerg Dantlgraber, Lohr (DE)

(73) Assignee: Bosch Rexroth AG, Stuttgart (DE)

( * ) Notice: Subject to any disclaimer, the term of this patent is extended or adjusted under 35 U.S.C. 154(b) by 177 days.

(21) Appl. No.: 11/571,728

(22) PCT Filed: Jul. 1, 2005

(86) PCT No.: PCT/EP2005/007105

§ 371 (c)(1),
(2), (4) Date: Jan. 7, 2008

(87) PCT Pub. No.: WO2006/005451

PCT Pub. Date: Jan. 19, 2006

(65) Prior Publication Data

US 2008/0199556 A1 Aug. 21, 2008

(30) Foreign Application Priority Data

Jul. 8, 2004 (DE) ............ 10 2004 033 102

(51) Int. Cl.
*B29C 45/50* (2006.01)
(52) U.S. Cl. ............ 425/145; 425/149; 425/170; 425/574
(58) Field of Classification Search .......... 425/145, 425/149, 170, 542, 556, 574, 587
See application file for complete search history.

(56) References Cited

U.S. PATENT DOCUMENTS

| 3,124,841 | A | 3/1964 | Keinosuke |
| 4,601,653 | A * | 7/1986 | Inaba ............ 425/587 |
| 5,747,076 | A | 5/1998 | Jaroschek et al. |
| 5,980,235 | A | 11/1999 | Eppich et al. |
| 7,004,742 | B2 * | 2/2006 | Ickinger ........ 425/149 |
| 7,086,851 | B2 * | 8/2006 | Ickinger et al. ........ 425/556 |
| 7,112,056 | B2 * | 9/2006 | Ickinger ........ 425/542 |
| 2002/0149268 | A1 * | 10/2002 | Yamada et al. ........ 307/143 |

FOREIGN PATENT DOCUMENTS

| DE | 100 45 907 A1 | 3/2002 |
| EP | 1 249 921 A | 10/2002 |
| WO | WO 02/085599 A1 | 10/2002 |

* cited by examiner

*Primary Examiner*—James Mackey
(74) *Attorney, Agent, or Firm*—Boyle Fredrickson S.C.

(57) ABSTRACT

Disclosed is a drive unit, in particular for an injection unit or an ejector of an injection molding machine, comprising a stroke spindle device with a spindle and a spindle nut, and a prestressing device for prestressing the spindle that is dischargeable in a displacement phase of the stroke spindle device and is chargeable when the spindle is driven in the opposite direction, wherein the stroke spindle device and the prestressing device are supported by the same component, and wherein a load measuring device is provided for measuring the load acting on the spindle, which senses the forces acting on the component.

6 Claims, 2 Drawing Sheets

DRIVE UNIT

BACKGROUND OF THE INVENTION

1. Field of the Invention

The invention relates to a drive unit, in particular for an injection unit or an ejector of an injection molding machine.

2. Description of Related Art

Such a drive unit is disclosed in U.S. Pat. No. 5,980,235. FIG. 4 shows a drive unit for an ejector, comprising a stroke spindle device with a spindle nut and a spindle, by which an ejector plate is adapted to be moved axially. The spindle nut is arranged rotatably in a base plate. In support of the stroke spindle device during retraction of the ejector plate, springs are positioned between the stroke spindle device and the ejector plate, said springs being tensioned when the ejector plate moves forward and correspondingly relieved when it retracts.

The disadvantage of this solution is that the springs have a retraction force that depends on the distance. It is further disadvantageous that the springs are subject to symptoms of fatigue, so that readjustment becomes necessary if they are used for a lengthy time. Moreover, the force transmittable for regulating the injection pressure is difficult to collect since, on the one hand, the force applied by the stroke spindle device has to be collected and, on the other hand, the force applied by the springs has to be collected.

WO 02/085599 A1 shows a drive unit for an ejector in which an injection-molded component is to be ejected by means of impact momentum. A stroke spindle device forms, together with an ejector plate, a swinging system that is positioned to swing in axial direction between a first and a second spring package. The first spring package is prestressed and relieved on loosening of an arrest, so that it acts on the opposite second spring package, whereupon the entire spring system is made to swing. For offsetting friction losses, the stroke spindle device is driven by a motor in correspondence with the oscillation frequency of the swinging system.

The disadvantage of this solution is that the spring forces practically cancel each other out and do not or just unsubstantially support the motor driving force of the stroke spindle device. The stroke spindle device rather only acts as an offset for the losses of motion of the spring packages. Furthermore, the motor triggering of the stroke spindle device in correspondence with the oscillation frequency requires expensive controlling. Another disadvantage is that with this solution, too, the injection force characteristics are hard to collect.

SUMMARY OF THE INVENTION

The present invention a drive unit, in particular for an injection unit or an ejector of an injection molding machine, which enables, with structure, a support of the force of a drive mechanism during an output movement, wherein forces to be applied by drive unit.

The goals of the invention are solved by a drive unit defined according to the claims.

The drive unit comprises a stroke spindle device with a spindle nut and a spindle. In addition, the drive unit comprises a prestressing device for prestressing the spindle which is adapted to be discharged in a displacement phase of the stroke spindle device and adapted to be charged in opposite direction. In accordance with the invention, the stroke spindle device and the prestressing device are supported by the same component directly or via elements that are interposed. Furthermore, in accordance with the invention there is provided a load measuring device for measuring the forces transmitted on the spindle, wherein the forces acting on the component are sensed.

The prestressing device prestresses the spindle, so that the displacement forces to be applied by a motor for driving the spindle nut are reduced in one direction. By means of the load measuring device, the forces acting on the stroke spindle device can be collected and can be involved in the regulation of the machine.

In a preferred embodiment, the spindle is prestressed in output direction. Thus, the driving force of the spindle nut is, during injection, reduced by the amount of the prestressing force, so that the stroke spindle device is, in particular in the area of the effective engagement of the spindle nut with the spindle, loaded less strongly. Therefore, the motor for driving the spindle nut can be designed to be of correspondingly weaker performance.

Retraction is also performed by the stroke spindle device, wherein the prestressing force is now directed against the direction of displacement of the spindle. Since the retraction is, apart from the prestressing force, however, effected almost absent of forces, the motor only has to act against the prestressing force when driving the spindle nut. If the prestressing force is chosen appropriately, the stroke spindle device has to absorb the same force during output or feed motion as during retraction. This can, for instance, be realized in that the prestressing force corresponds to approximately half of the effective injection force.

Advantageously, the prestressing device is formed by at least one hydraulic cylinder which a hydraulic storage means is ideally assigned to for providing a constant prestressing force.

Preferably, the load measuring device is a load cell. It is, however, also feasible to use a pressure transducer or a voltmeter.

In a further embodiment, a spring-operating storage means is additionally assigned to the prestressing device.

Other advantageous embodiments are the subject matters of further subclaims.

BRIEF DESCRIPTION OF THE DRAWINGS

In the following, preferred embodiments of the invention will be explained in detail by means of schematic representations. There show.

DETAILED DESCRIPTION OF THE PREFERRED EMBODIMENT

Figure 1:
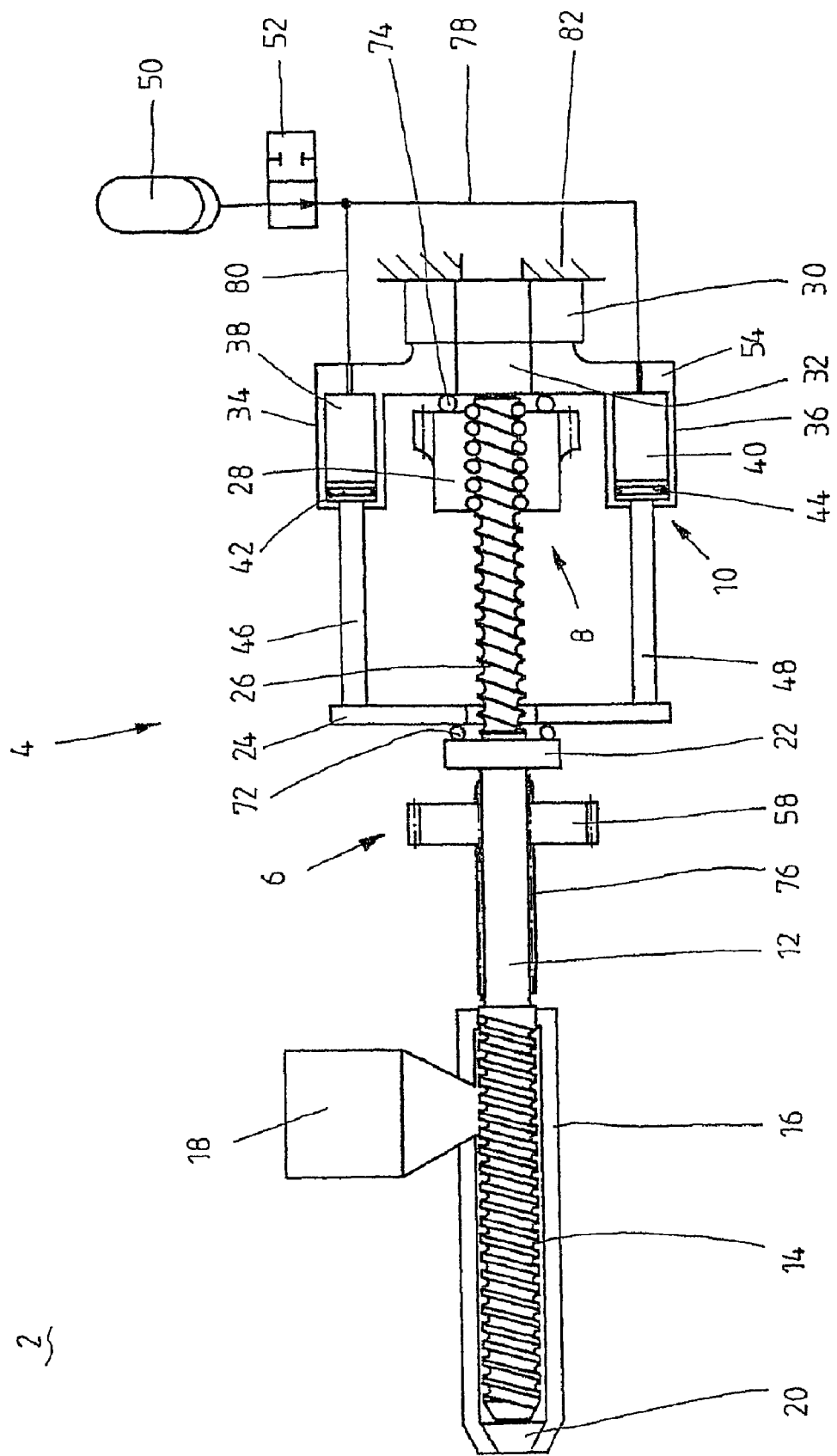
FIG. 1 a first embodiment of a drive unit according to the invention.

FIG. 1 shows an injection unit 2 for an injection molding machine with a first inventive drive unit 4. The drive unit 4 comprises a plastification drive 6, an injection drive 8, and a prestressing device 10.

The plastification drive 6 for plastifying is supported by a frame 82 (not illustrated) and engages, by means of the toothed wheel 58, a front-side extension 12 of a worm gear 14. For rotation-proof incorporation of the toothed wheel 58, the worm gear 14 comprises engagement edges 76, so that the worm gear 14 is made to rotate correspondingly on triggering of the plastification drive 6. The effective engagement of the plastification drive 6 with the extension 12 is performed such that the latter and thus the worm gear 14 can be shifted axially.

The worm gear 14 is accommodated in a heated plastification cylinder 16 that is adapted to be filled with mould material via a filling funnel 18. By rotation of the worm gear 14, the mould material is drawn into a collecting chamber 20 toward a front-side injection nozzle (not illustrated) in the head portion of the plastification cylinder 16 and is molten. The extension 12 comprises, at an end portion opposite to the worm gear 14, a circumferential flange 22 via which it is supported by a traverse 24 with an axial bearing 72.

The injection drive 8 for injecting the mould material comprises a stroke spindle device designed as ball rolling thread with a spindle 26 and a spindle nut 28. The spindle nut 28 that is driven by a motor (not illustrated) is supported by a component 54 via an axial bearing 74. In the component 54, a through hole 32 is formed coaxially to the spindle 26 for the section-wise incorporation of the spindle 26 during retraction (movement to the right in FIG. 1). The component 54 itself is supported by the frame 82 via a load cell 30. By means of the load cell 30, the current load exerted on the spindle 26 and thus, for instance, the current injection force for injecting the mould material into a tool can be collected. The spindle 26 penetrates the traverse 24 and engages with the front side at the flange 22 of the extension 12. On rotation of the spindle nut 28, the spindle 26 performs an axial shift that is transmitted to the worm gear 14, so that the worm gear 14 is introduced into or retracted from the plastification cylinder 16 depending on the direction of rotation of the spindle nut 28.

The prestressing device 10 for prestressing the stroke spindle arrangement comprises, for instance, two or four hydraulic cylinders 34, 36 that are positioned in pairs one behind the other and that are supported by the component 54 laterally of the spindle nut 28. In the present Figure, the hydraulic cylinders 34, 36 are integrated into the component 54. Thus, the prestressing device 10 and the stroke spindle device are together supported by the component 54. In cylinder chambers 38, 40 of the hydraulic cylinders 34, 36, pistons 42, 44 are provided which impact, via their piston rods 46, 48, the traverse 24 with a force that is equivalent to the pressure in the hydraulic cylinders 34, 36, so that the spindle 26 is correspondingly prestressed.

The prestressing device 10 furthermore comprises a hydraulic storage means 50. It is, via a feed line 78 or a branch line 80, respectively, that opens into the feed line 78, connected with the cylinder chambers 38, 40 of the hydraulic cylinders 34, 36, so that, irrespective of an axial shift of the pistons 42, 44, the pressure level in the cylinder chambers 38, 40 is kept substantially constant. The hydraulic storage means 50 is prestressed such that the hydraulic cylinders 34, 36 apply a force on the worm gear 14 which corresponds to approximately 50 percent of the force applied by the injection drive 8. The hydraulic storage means 50 can be connected or disconnected via a control valve 52.

The functioning of the inventive drive unit 4 will be explained in the following. It is assumed that the worm gear 14 is completely contained in the plastification cylinder 16.

For plastification after an injection process, the worm gear 14 has to be moved to the right to open the collecting chamber 20 for fresh mould material. The spindle nut 28 is triggered such that the spindle 26 is moved axially to the right, so that the worm gear 14 is drawn out of the plastification cylinder 16. In so doing, the motor of the stroke spindle device has to overcome the prestressing force of the prestressing device 10 which is directed in the opposite direction. Simultaneously, the hydraulic storage means 50 is charged as the spindle 26 moves to the right. For filling the collecting chamber 20 that is enlarging, the plastification drive 6 is triggered such that fresh mould material is conveyed from the filling funnel 18.

Once sufficient mould material has been supplied into the collecting chamber 20, the retraction movement of the worm gear 14 is stopped. The worm gear 14 is in the meantime pressed to the right by the mould material that piles up.

The overcoming of the prestressing force does not constitute an extraordinary strain for the injection drive 8 since the retraction is, apart from the counter-acting prestressing force, performed practically absent of forces. If the prestressing force is chosen appropriately, the drive force to be applied by the injection drive 8 is equal during plastification and during injection, so that the injection drive 8 has to perform the same driving power during plastification and during injection. This is, for instance, the case if the prestressing force is half as large as the injection force required during injection.

During injection, the spindle nut 28 is triggered such that the spindle 26 and thus the worm gear 14 are moved to the left, so that the mould material fed into the collecting chamber 20 is pressed into the tool by means of the injection nozzle. In so doing, the axial movement of the spindle 26 is supported by the hydraulic cylinders 34, 36, so that, for driving the spindle nut 28, the motor has to apply only 50 percent of the necessary power that it would have to apply without pressure support. If the injection pressure is, for instance, 10 t, the injection drive 8 would have to apply 5 t while the other 5 t are assumed by the hydraulic prestressing device 10. The injection is followed by a post pressure process in which the injected mould material is impacted pursuant to a particular pressure profile for a lengthy time.

By means of the load cell 30, the force acting on the spindle 26 or on the worm gear 14, respectively, can be collected, which is required to support the spindle 26 and the hydraulic cylinders 34, 36 by the component 54, so that the effort with respect to measurement technology is substantially minor than with the initially described solutions in which two load cells are required.

Figure 2:
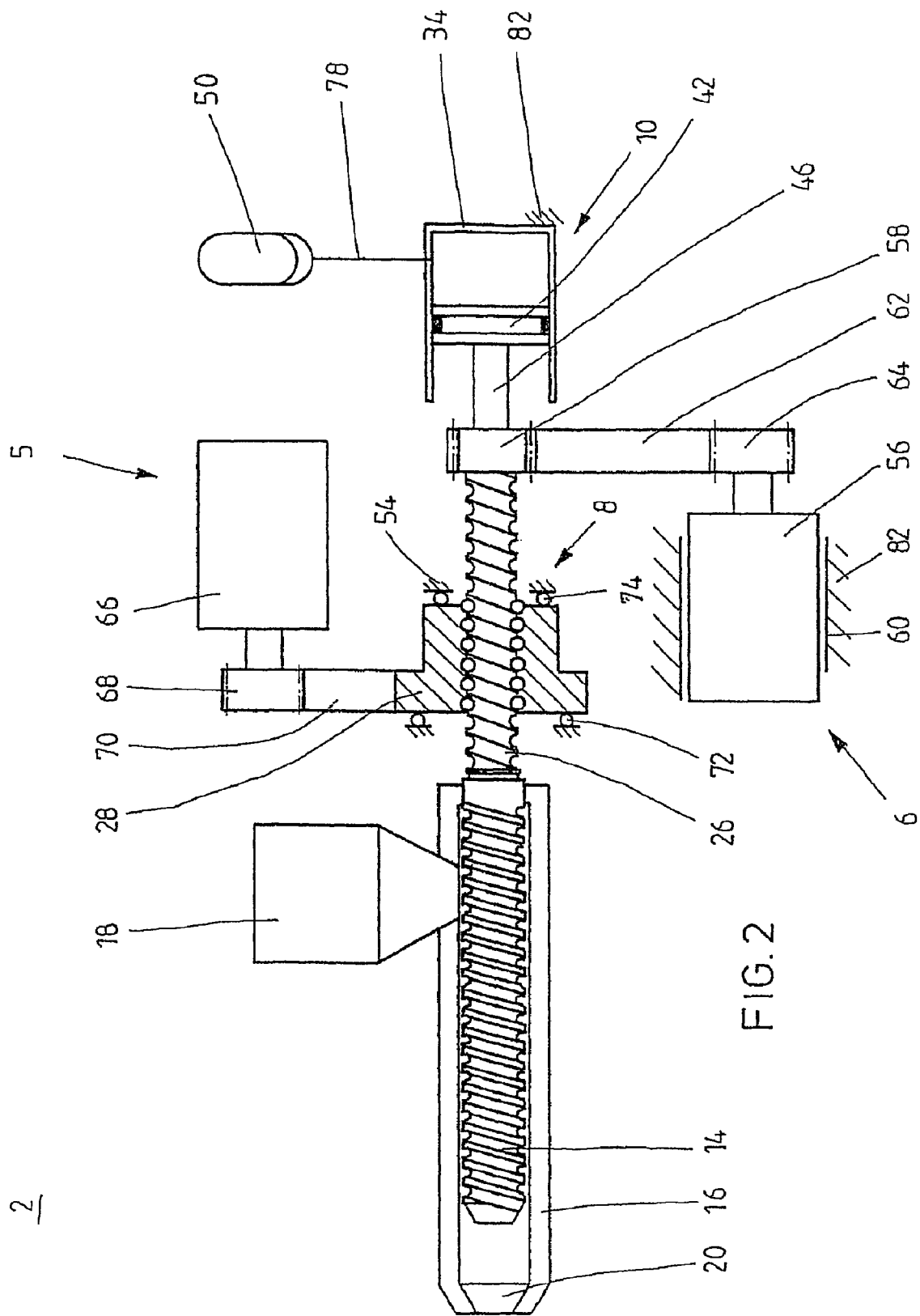
FIG. 2 a second embodiment of a drive unit according to the invention.

FIG. 2 shows an injection unit 2 for an injection molding machine, comprising a second inventive drive unit 5 in which an injection drive 8 and a prestressing device 10 are arranged in series.

A plastification drive 6 comprises a motor 56 that is mounted to be shifted axially in a sleeve 60 at a frame 82. The motor 56 comprises a motor output gear 64 that drives, via a toothed belt 62, a toothed wheel 58 at a first end portion of a spindle 26, so that, on triggering of the motor 56, the spindle 26 is made to rotate for plastification. The spindle 26 is at its front side connected with its second end portion with a worm gear 14 in a heated plastification cylinder 16. The plastification cylinder 16 comprises, like the afore-described embodiment, a filling funnel 18, a collecting chamber 20, and an injection nozzle (not illustrated).

The injection drive 8 comprises a motor 66 with a motor output gear 68 via which a spindle nut 28 that meshes with the spindle 26 via a ball rolling thread is adapted to be driven with a toothed belt 70, so that the spindle 26 is adapted to be shifted axially free from play. The spindle nut 28 is supported in a shift-proof manner by a component 54 between axial bearings 72, 74. The component 54 is again supported, like with the first embodiment of FIG. 1, by the frame 82 via a load cell (not illustrated).

The prestressing device 10 comprises one single hydraulic cylinder 34 which accommodates a shiftable piston 42. The hydraulic cylinder 34 is supported by the same component 54 as the spindle nut 28, so that it is assigned the same load cell as the spindle 26. The piston 42 engages, via its piston rod 46, with its front side at the first end portion of the spindle 26. Via a hydraulic storage means 50 that is in communication with the hydraulic cylinder 34 by means of a feed line 78, the pre-stressing force can be kept constant irrespective of the axial shifting distance of the spindle 26.

The functioning of this injection device corresponds to that described with respect to FIG. 1, so that a new explanation is omitted.

Disclosed is a drive unit, in particular for an injection unit or an ejector of an injection molding machine, comprising a stroke spindle device with a spindle and a spindle nut, and a prestressing device for prestressing the spindle that is dischargeable in a displacement phase of the stroke spindle device and is chargeable when the spindle is driven in the opposite direction, wherein the stroke spindle device and the prestressing device are supported by the same component, wherein a load measuring device is provided for measuring the load acting on the spindle, which senses the forces acting on the component.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

The invention claimed is:

1. A drive unit for an injection unit or an ejector of an injection molding machine, comprising a stroke spindle device with a spindle and a spindle nut, and a prestressing device provided for prestressing the spindle which is dischargeable in a displacement phase of the stroke spindle device in which the spindle is driven in a first direction and is chargeable when the spindle is driven in a second direction that is opposite the first direction, wherein each of said stroke spindle device and said prestressing device is directly or indirectly supported by a common component, and wherein the component is supported by a stationary frame via a load cell which is provided as a load measuring device that measures the load acting on said spindle and acting on said component.

2. The drive unit according to claim 1, wherein said prestressing device prestresses said spindle in an output direction, toward a plastification cylinder.

3. The drive unit according to claim 1, wherein said prestressing device comprises at least one hydraulic cylinder.

4. The drive unit according to claim 3, wherein a hydraulic storage means is operably connected to the cylinder for providing a substantially constant prestressing force acting on said stroke spindle device.

5. The drive unit according to claim 3, wherein at least two cylinders are provided which are connected in parallel to said stroke spindle device.

6. A drive unit for an injection unit or an ejector of an injection molding machine, comprising:
 a stroke spindle device having a spindle nut and a spindle, the spindle being drivable in (i) a first direction during a displacement phase of the stroke spindle device, and (ii) a second, opposite direction;
 a prestressing device cooperating with and prestressing the stroke spindle, the prestressing device being (i) dischargeable when the spindle is driven in the first direction during the displacement phase of the stroke spindle device, and (ii) chargeable when the spindle is driven in the second direction;
 a common component supporting each of the stroke spindle device and the prestressing device;
 a stationary frame; and
 a load cell extending between the common component and the stationary frame and measuring the load acting on the spindle and forces acting on the common component.

* * * * *